United States Patent [19]

Fonsalas et al.

[11] Patent Number: 4,922,342
[45] Date of Patent: May 1, 1990

[54] SYSTEM OF TRANSMITTING HIGH-DEFINITION TELEVISION PICTURES VIA A NARROW-PASSBAND CHANNEL

[75] Inventors: Frédéric L. J. Fonsalas, Grigny; Jeans-Yves L. Lejard, Paris; Pascal F. P. Hayet, Chatenay Malabry; Marcel R. Le Queau, Ozoir la Ferriere, all of France

[73] Assignee: U.S. Philips Corporation, New York, N.Y.

[21] Appl. No.: 173,687

[22] Filed: Mar. 24, 1988

[30] Foreign Application Priority Data

Mar. 24, 1987 [FR] France ................ 87 04070

[51] Int. Cl.⁵ .................................... H04N 7/12
[52] U.S. Cl. ...................... 358/138; 358/12
[58] Field of Search ............ 358/138, 133, 11, 12, 358/13, 140, 160

[56] References Cited

U.S. PATENT DOCUMENTS 4,782,387 11/1988 Sabri et al. ..................... 358/138 X

FOREIGN PATENT DOCUMENTS

0146713 7/1985 European Pat. Off. .
0174058 3/1986 European Pat. Off. .
2302645 9/1976 France .

Primary Examiner—James J. Groody
Assistant Examiner—Victor R. Kostak
Attorney, Agent, or Firm—Edward W. Goodman

[57] ABSTRACT

A transmission system for TV transmission in the D2 MAC/packet mode includes a transmission part formed by an arrangement (1) for supplying pictures constituted by a plurality of picture elements or samples distributed over even and odd lines, a filter member (22) for filtering the samples of the filtered samples, a sub-sampling circuit (20) for taking certain samples from the output of the filter member, and the output of a transmitter circuit (5) for transmitting through the channel the samples taken, and also includes at least one receiving part constituted by a receiving circuit (10) for receiving the samples taken, an interpolation member (41) for recovering samples from the samples received and a first display circuit (50) for converting the recovered and received samples into a high-definition restituted picture.

18 Claims, 7 Drawing Sheets

FIG.1

FIG.2 PRIOR ART $\square : t + 4kT$
$\stackrel{\star}{\star} : t + (4k+1)T$
$\triangle : t + (4k+2)T$
$\bigcirc : t + (4k+3)T$

SYSTEM OF TRANSMITTING HIGH-DEFINITION TELEVISION PICTURES VIA A NARROW-PASSBAND CHANNEL

BACKGROUND OF THE INVENTION

The present invention relates to a system for the transmission of high-definition television pictures via a narrow passband channel, the system comprising a transmission part formed by an arrangement for providing said pictures which are constituted by a plurality of picture elements or samples distributed over even and odd lines, a filter member for filtering said samples, a sampling circuit for taking certain samples from the output of the filter member and a transmission circuit for transmitting said samples via the channel, also at least one receiving part formed by a receiving circuit for receiving said samples, an interpolation member for recovering samples on the basis of received samples and a first display circuit for converting the recovered samples into a restored high-definition picture.

The present invention also relates to a transmitter and a receiver suitable for the system.

Systems of this type are well known and are used with great advantage more specifically in the transmission of high-definition pictures which are compatible with the "MAC" standards, more particularly the "D2-MAC" standard (recommendation 601 of the C.C.I.R).

A prior art system of this type is described in the article "A SINGLE CHANNEL HDTV BROADCAST SYSTEM—THE MUSE—" by Yuichi Ninomiya et al, published in the periodical "NHK LABORATORIES NOTE", vol. 304 of September 1984. This MUSE system, which is not adapted to said procedures, can easily be rendered suitable for these procedures by linearly modifying its characteristic parameters. This known system utilizes, for the transmission of the samples of a picture, a sampling structure which extends over four fields. Picture elements belonging to different spatial positions are transmitted in these four consecutive fields. When the processed picture is a still picture a good quality is obtained. On the other hand, the transmission in four fields does not render it possible to obtain a good quality for the recovery of moving pictures in which portions move perceptibly during four consecutive fields.

SUMMARY OF THE INVENTION

One of the objects of the present invention is to obviate this drawback to a certain extent and consequently to enable the recovery, with a better quality, of the moving pictures.

Since the high-definition pictures have an aspect ratio 16/9 (width divided by height) which is close to the aspect ratio of a movie picture frame, the requirement is imposed that the number of recovered picture elements along the horizontal and vertical axes of the picture must be in the same ratio.

A further object of the invention is to satisfy this requirement.

To accomplish these objects, a system of the type defined in the opening paragraph is characterized in that the sampling circuit is designed to take, on lines of equal parities, first samples sequences of n consecutive samples for a first field, and second samples said first samples from these sequences for a second field.

In addition to the possibility of transmitting high-definition pictures, also compatibility with a system comprising, for example, receivers of the D2-MAC/packet type is required.

An important feature of the invention renders it possible to provide this compatibility with receivers of the above-defined type. Such a system is moreover characterized in that the sampling circuit is provided to apply samples to the transmitter circuit in an order referred to as the "compatible order", this order being defined by alternately considering the samples from line to line while at least a receiving portion includes, connected to the output of the receiving circuit, a second normal display circuit for recovering a picture having a normal definition and in that each receiving portion includes a change-order member disposed between the receiving circuit and the interpolation member.

The following description which is given by way of nonlimitative example with reference to the accompanying drawings will make it better understood how the invention can be put into effect. In the drawings:

DETAILED DESCRIPTION OF THE INVENTION

Figure 1:
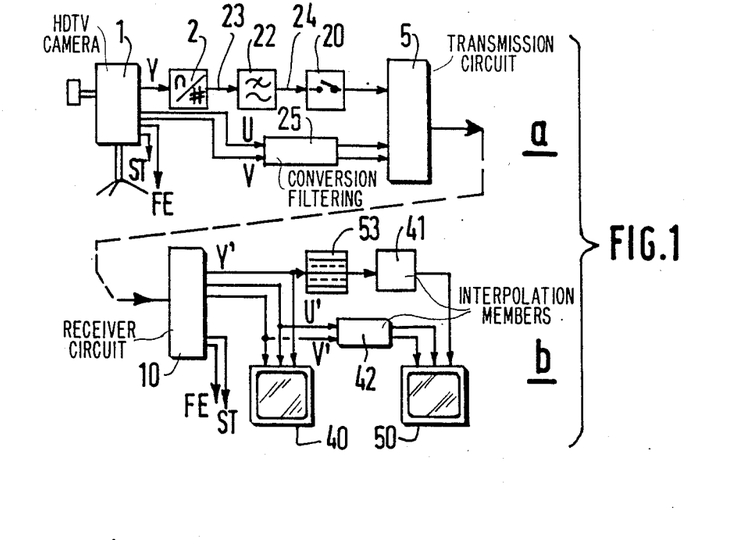
FIG. 1 shows a transmission system according to the invention.

The system of FIG. 1 comprises a transmission part shown at a and a receiving part shown at b.

In this figure, reference numeral 1 denotes a high-definition television (HDTV) camera supplying, in analog form, the luminance signals Y andd the color difference signals U and V. In the present description, the luminance signals are of main interest as these signals cause the majority of the problems during transmission. A processing operation similar to the one just described can be effected on the signals U and V, however at a much lower rate. An analog-to-digital converter 2 produces different digital samples, each of which represents the luminance of a picture element. These samples occur at the instants t, t+TP, t+2TP, . . . where TP=1/(54 MHZ) and define an interlaced picture having 1250 lines, which is double the definition of the conventional normal 625-line pictures, both in the vertical and in the horizontal direction. As one wants to transmit this picture via a transmission circuit 5-10 which operates in accordance with a MAC standard and is formed by a transmission circuit 5 and a receiver circuit 10, only some of these samples must be transmitted; for that purpose a sampling circuit 20 is used which is preceded by a filter member 22 having an input terminal 23 for connection to the output of the converter 2 and an output terminal 24 for connection to the circuit 20. The signals U and V are submitted to the same processing operation effected by the member 25 at a twice lower frequency. The receiving circuit 10 applies the luminance signals and the color difference signals Y', U' and V', respectively, to a television set 40 for the recovery of a normal-definition television picture and also to the interpolation members 41 and 42 for processing the additional picture elements on the basis of the received elements in such a manner that a second television set 50 produces a high-definition picture.

In accordance with the above-described feature which ensures the compatibility, a change-order member 53 is provided at the receiving side, which changes the order of appearance of the samples at the output of the receiving circuit 10 in a manner still to be described hereinafter.

Figure 2:
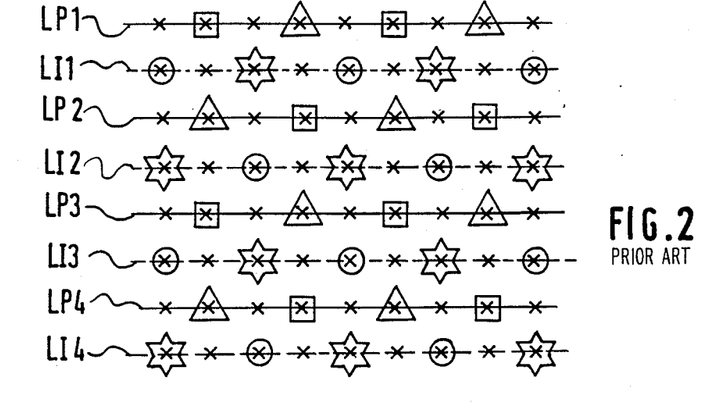
FIG. 2 shows the sampling structure of a prior art system.

For a proper understanding of the invention, FIG. 2 shows the sampling structure of the prior art system disclosed in the reference mentioned in the foregoing. All the samples at the output of the converter 2 are represented by crosses and are distributed over the even lines LP in solid lines ... LP1, LP2, LP3, LP4 .. . and the odd lines LI in broken lines LI1, LI2, LI3, LI4. In a first field transmitted at the instant t and at the instants (t+4kT), wherein K=0, 1, 2 ... and T is the duration of a field, the sampling circuit of the known system transmits all the samples which are surrounded by a square box. These samples are taken one out of four from even lines and in qunicunx; thereafter the sampling circuit transmits in a second field at the instant t+T and at the instants t+(4k+1)T all the samples which are enclosed in a star. These samples are taken one out of four from odd lines and in qunicunx and are shifted horizontally through one position relative to those transmitted at the instant t.

Thereafter at the instant t+2T and at the instants t+(4k+2)T, in a third field the samples surrounded by a triangle are transmitted. These samples are taken from the even lines, one sample out of four, and are shifted horizontally through two positions relative to the samples enclosed in a square box.

Finally, at the instant t+3T and at the instants t+(4k+3)T in a fourth field the samples surrounded by a circle are transmitted. These samples are taken from the odd lines, one sample out of four, and are shifted horizontally through two positions relative to the samples enclosed in a star.

Figure 3:
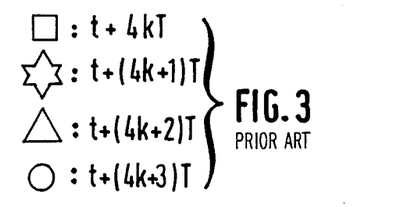
FIG. 3 is a legend for FIG. 2.

FIG. 3 is a legend which represents the transmission in each field of the different samples.

A periodical structure in the Fourier domain corresponds to any space-time periodic sampling structure. On this subject reference is made to the article by KRETZ and SABATIER, entitled "Echantillonnage des images de télévision" published in the Annales de Télécommunications 36, nr. 3-4, 1981, pp. 231-273. There it is shown that the structure in the Fourier domain shown in FIG. 4 corresponds to the structure of FIG. 2. In this Figure, the picture elements which are the centers of the space-time spectra of the pictures are denoted by P0, P1, P2, P3 and P4. These picture elements are referenced by the axes fx, fy and ft which are graduated in cpw (horizontal definition unit corresponding to the cycles per picture width), in cph (unit corresponding to the cycles per picture height) and in Hz, respectively.

Figure 4:
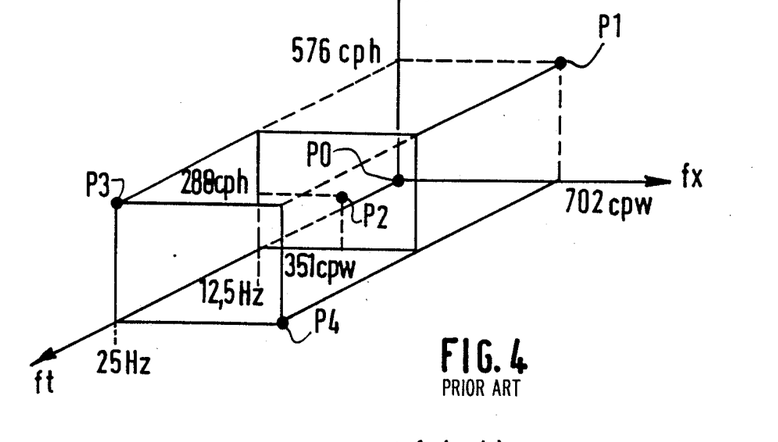
FIG. 4 shows the picture elements in the Fourier space around which the image spectra are produced and which relate to the structure of FIG. 2.

The picture element P0 is at the origin. The picture P1 is defined by fx=702 cpw, fy=576 cph and ft=0 Hz, the picture element P2 by fx=351 cpw, fy=288 cph and ft=12.5 Hz, the picture element P3 by fx=0 cpw, fy=576 cph and ft=25 Hz, the picture element P4 by fx=702 cpw, fy=0 cph and ft=25 Hz.

To prevent the spectra which occur around these picture elements from overlapping, it will be obvious that a filtering operation is necessary before sub-sampling the signal.

Figure 5:
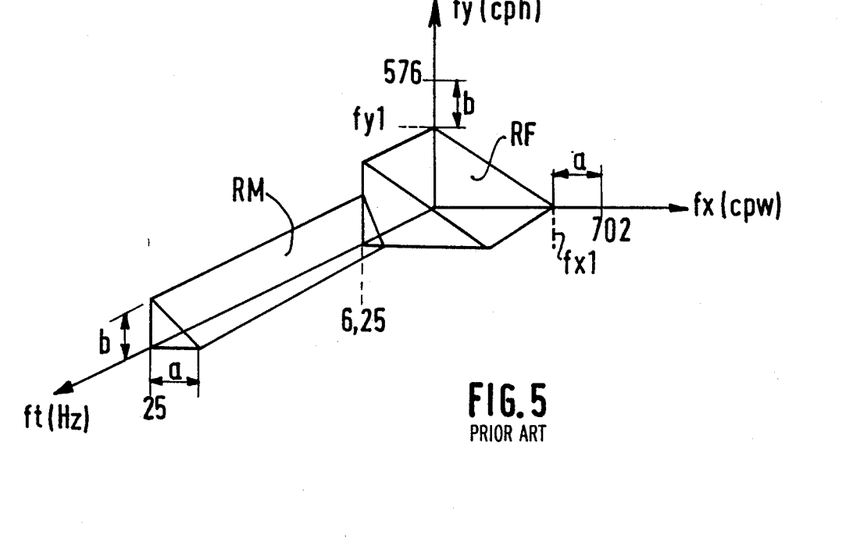
FIG. 5 shows a possible support for the transfer function of the prior art system.

FIG. 5 shows a filter domain suitable for the sampling structure of FIG. 4. This filtering domain is a space within the transfer function of an ideal filter would be "1" and outside which this function would be zero.

This filter domain is formed from two regions RF and RM. The region RF is placed near the zero temporal frequency plane and its extension in the directions fx and fy is more important than the second region RM situated in much higher temporal frequencies. In practice, these two regions correspond, for the first RF, to the case of still pictures or slow-moving, animated pictures and, for the second RM, to the case of rapidly moving pictures. Applicants appreciate, when one wants to avoid any overlapping of the spectrum after sub-sampling, that this puts a constraint on the maximum extension of these two zones RF and RM along the axes fy and fx.

Put more accurately, the sum of the resolutions, along these axes, with regard to the almost still pictures and moving pictures, must not exceed half the sampling rate. Thus, referring to FIG. 5, the region RF intersects the axis fx in a point fx1 and the axis fy in a point fy1, while the region RM stretches along the axis fx up to a distance "a" along the axis fy up to a distance "b". When, on the one hand, Rvf and Rhf are denoted the vertical and horizontal resolutions of the still pictures and, on the other hand, Rvm and Rhm the vertical and horizontal resolutions of the moving pictures, then:

$$Rhf = fx1$$

$$Rhm = a$$

$$Rvf = fy1$$

$$Rvf = b$$

Considering the coordinates of the point P1, the best possible results are:

$$Rhf + Rhm = 702 \text{ cpw}$$

$$Rvf + Rvm = 576 \text{ cph}$$

When values are chosen which are considered appropriate for the natural pictures for the parameters a, b, fx1, fy1, it is, for example, possible to obtain:

| | |
|---|---|
| Rhf = 421.2 cpw | Rvf = 345.6 cph |

| Rhm = 280.8 cpw | Rvm = 230.4 cph |
|---|---|

In addition to the sum condition mentioned, it will be obvious that the point P2 limits at fy and fx the development of the region RM while extending it towards ft=0 Hz. This explains the first drawback which consists in a poor recovery of the moving pictures.

The second drawback follows from the values Rhf and Rvf mentioned above. Actually, when their ratio is assumed to be $\rho$ it is found that:

$$\rho = \frac{Rhf}{Rvf} = 1.22$$

This ratio must approach the cinema format 16/9. In order to obtain a good visual impression from this format, the same number of points must be visual in the horizontal and the vertical direction; the ratio $\rho$ is then too low.

To avoid these drawbacks, in accordance with the invention, the sub-sampling circuit 20 is designed to take, from the consecutive samples ... E10, E11, E12, E13, E14, E15 ... distributed over a first line LP1, and E20, E21, E22, E23 ... distributed over a second line LI1, ... E30, E31, E32 ... distributed over a third line LP2 and ... E40, E41, E42 ... distributed over a fourth line LI2 etc. ... (see FIG. 6), on the one hand, a first sample indicated by a square box E11, E15, ... E33, E37 from a sequence of four samples which form part of the even lines and to transmit it in a first field (MAC field), and, on the other hand, the subsequent sample in this sequence indicated by a star E12, E16, E30, E34 to transmit it in a second field.

Figures 7, 8:
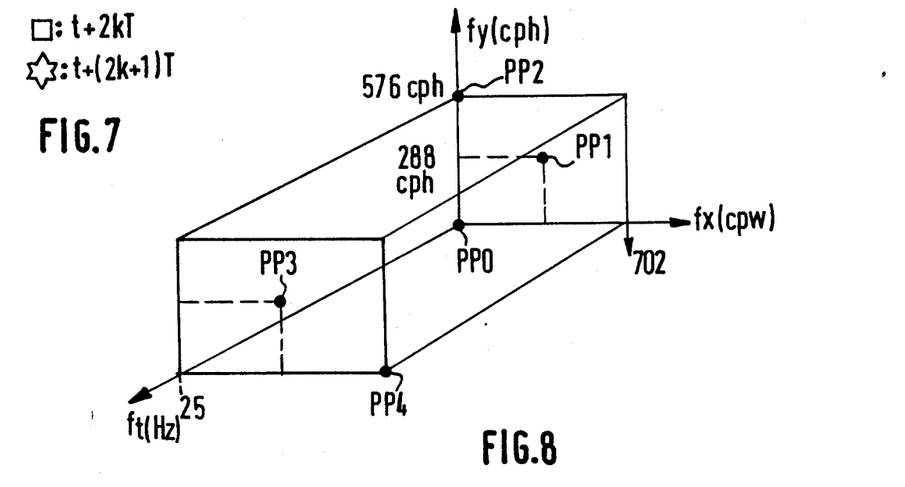
FIG. 7 is a legend for FIG. 6.
FIG. 8 shows the picture elements of the Fourier space around which the image spectra are produced and which relate to FIG. 6.

FIG. 7 shows that the samples enclosed in a square are transmitted in a first field at the instants t+2kT and the samples enclosed in a star in a second field at the instants t+(2k+1)T.

Figure 6:
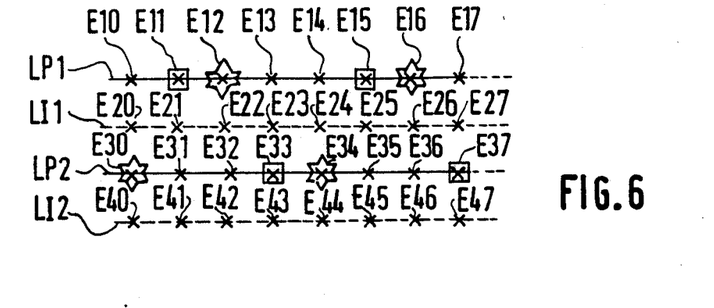
FIG. 6 shows the sampling structure according to the invention.

A periodic structure in the Fourier domain corresponds to this sampling structure of FIG. 6. The picture elements PP0, PP1, PP2, PP3 and PP4 are the elements around which the space-time spectra of the pictures are formed. The coordinates of these elements are as follows:

| PP0: (0 Hz, 0 cph, 0 cpw) | PP1: (0 Hz, 288 cph, 350 cpw) |
|---|---|
| PP2: (0 Hz, 576 cph, 0 cpw) | PP3: (25 Hz, 288 cph, 350 cpw) |
| PP4: (25 Hz, 0 cph, 502 cpw). | |

Figure 9:
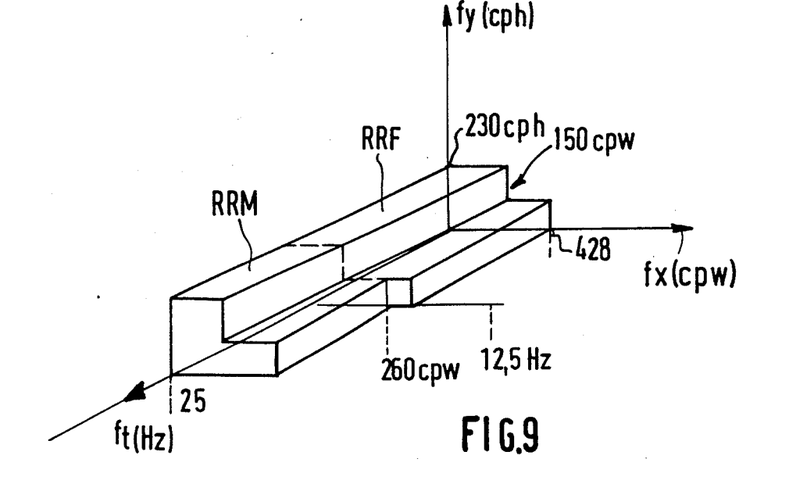
FIG. 9 shows a support of the transfer function of a filter member suitable for the invention.
Figure 10:
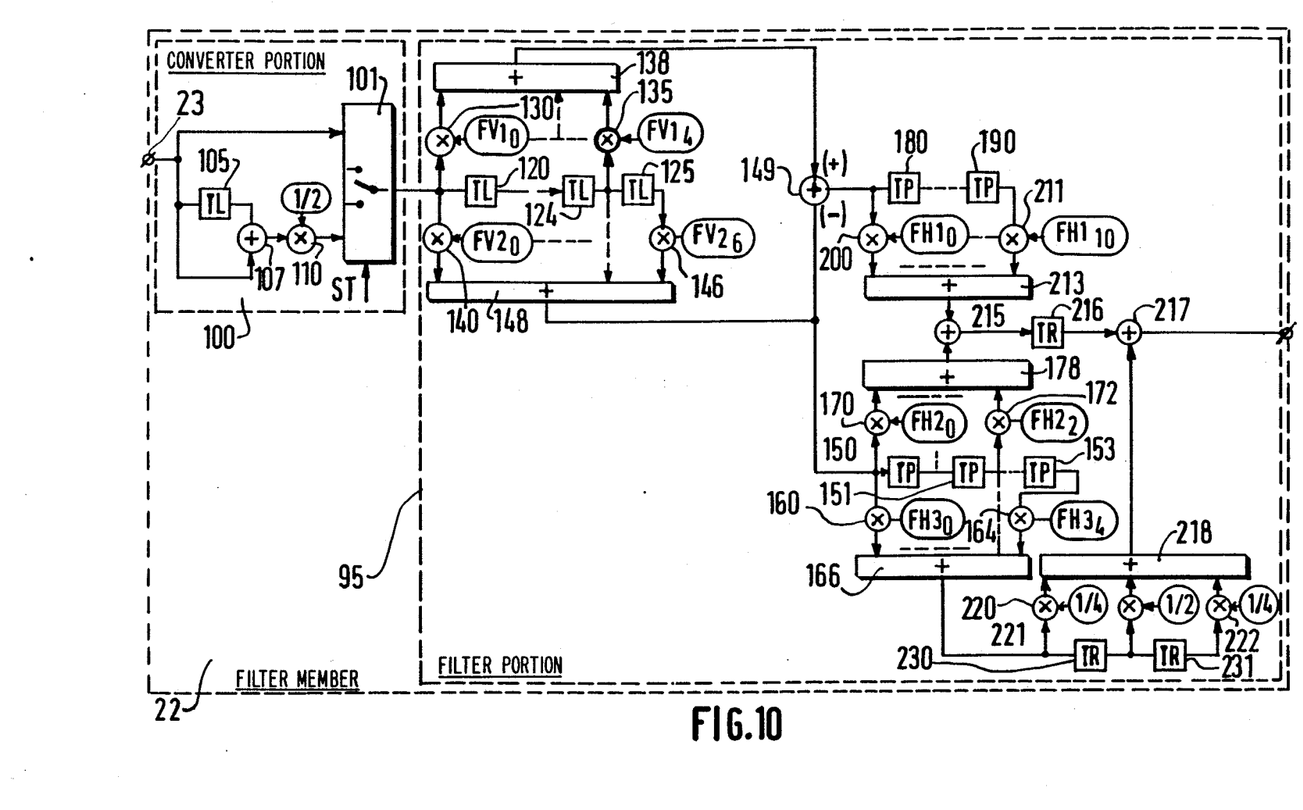
FIG. 10 is a detailed representation of the structure of the filter member.
Figure 13:
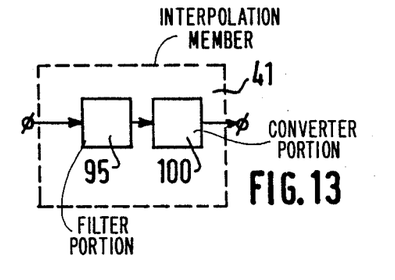
FIG. 13 is a detailed representation of the structure of the interpolation member.

FIG. 9 shows the support of the transfer function retained for this sampling structure. Rectangular shapes which are more easily approximated by the filters shown in the FIGS. 10 and 13 are preferred to the triangular shapes shown in FIG. 5. The region relating to still pictures is denoted by RRF and the region relating to moving pictures is denoted by RRM. These two regions are separated by a defined plane $f_T$=12.5 Hz. The region RRF is limited between the planes $f_T$=0 Hz and 12.5 Hz by a plane fy=230 cph for fx=0 to 130 cpw and by a plane fy=130 cph for fx=130 to 428 cpw. The region RRM is limited between the planes $f_T$=12.5 Hz to 25 Hz by the same plane fy=230 cph for fx=0 to 130 cpw and fy=130 cph for fx=130 to 260 cpw. It can then be seen that the ratio $\rho$ becomes equal to:

$$\rho = \frac{428}{230} = 1.9$$

which value is very near to the desired value (1.77) for a cinema picture format.

FIG. 10 shows the circuit diagram of a filter member suitable for the system according to the invention. It is formed from a filter portion 95 which is preceded by a converter portion 100 to convert the pictures applied to the terminal 23 in the form of interlaced and non-interlaced pictures. A change-over switch 101, which is controlled by a signal ST coming from the camera 1, selects at the field rate either the line of picture elements which are directly applied to the output of the converter 2, or a line of picture elements obtained by interpolation. This interpolation is effected by means of a delay device 105 producing a time delay TL (equal to the duration of one line) and an adder 107 for adding the signals from the current line (at terminal 23) to the signals on the delayed line. This sum is thereafter divided by two to provide that the value remains standardized relative to the current line; a multiplier 110 which multiplies the output signal of the adder 107 by ½ is used for that purpose.

The signal, or sample, selected by the change-over switch 101 is consequently either the current sample or the interpolated sample; it is applied to a first chain of delay elements 120 ... 124, 125 which each produce a delay equal to TL. On the one hand, a sequence of multipliers 130 to 135 for multiplying the samples taken from the inputs of the different delay elements 120 ... 125 by coefficients $FV1_0$ to $FV1_4$, is assoociated with this chain; an adder 138 takes the sum of all the results supplied by these multipliers 130 to 135. On the other hand, a further sequence of multipliers 140 to 146 for multiplying the samples at the input of the element 120, at the output of this element 120 and at the outputs of the elements 121 to 125 by the coefficients $FV2_0$ to $FV2_6$ is associated with this chain. An adder 148 takes the sum of the results supplied by these multipliers 140 to 146. The digital sample processed by the adder 148 is applied to the (−) input of a subtraction member 149 to be subtracted from the sample at the output of the adder 138 and also to a second chain of delay elements 150, 151, ... 153, each of these elements producing a delay TP equal to the sampling period for the picture elements. A first sequence multipliers 160 to 164 multiplies the different samples at the input of the element 150, at its output and at the outputs of the subsequent elements by $FH3_0$ ... $FH3_4$. An adder 166 takes the sum of the results supplied by these multipliers 160 to 164. A second sequence of multipliers 170, ... 172 is associated with this chain of delay elements (150 ... 153) to multiply the different samples present at the inputs of the elements 150 to 152 by the coefficients $FH2_0$ ... $FH2_2$. An adder 178 supplies the sum of the results of these multipliers 170 to 172.

A third chain of delay elements 180 to 190, each of which produces a delay equal to TP, to which the output of subtraction member 149 is applied, applies different delayed samples to the multipliers 200 to 211 for multiplying these samples by the coefficients $FH1_0$ to $FH1_{10}$; an adder 213 takes the sum of the results of these multipliers. An adder 215 takes the sum of the samples produced by the adders 178 and 213. This sum is delayed by the delay element 216 which produces a delay TR equal to the duration T of a field, before it is added by an adder 217 to a sample coming from a further adder 218. This adder 218 receives the samples from the multipliers 220, 221 and 222 which multiply the samples coming from the adder 166 by ¼, ½, ¼, respectively, these samples themselves being delayed by an element 230 and by a further element 231, each producing a delay equal to TR. The output of the adder 217 is connected to the terminal 24.

The coefficients have the following values:

| | | |
|---|---|---|
| $FV1_0$: −1/16 | | $FV2_0$: 1/16 |
| $FV1_1$: 4/16 | | $FV2_1$: 2/16 |
| $FV1_2$: 10/16 | | $FV2_2$: 3/16 |
| $FV1_3$: 4/16 | | $FV2_3$: 4/16 |
| $FV1_4$: −1/16 | | $FV2_4$: 3/16 |
| | | $FV2_5$: 2/16 |
| | | $FV2_6$: 1/16 |
| $FH1_0$: 1/64 | $FH2_0$: ½ | $FH3_0$: −⅛ |
| $FH1_1$: 2/64 | $FH2_1$: ½ | $FH3_1$: 0 |
| $FH1_2$: 5/64 | $FH2_2$: ½ | $FH3_2$: ¼ |
| $FH1_3$: 8/64 | | $FH3_3$: 0 |
| $FH1_4$: 10/64 | | $FH3_4$: −⅛ |
| $FH1_5$: 12/64 | | |
| $FH1_6$: 10/64 | | |
| $FH1_7$: 8/64 | | |
| $FH1_8$: 5/64 | | |
| $FH1_9$: 2/64 | | |
| $FH1_{10}$: 1/64 | | |

Figure 11:
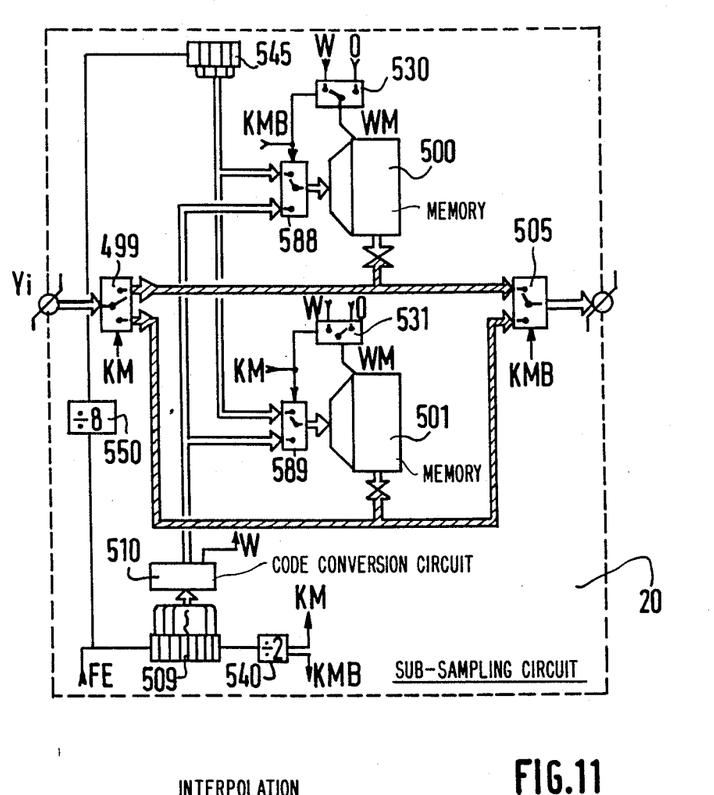
FIG. 11 is a detailed representation of the structure of the sampling circuit.

FIG. 11 is a detailed representation of the sub-sampling circuit 20.

The luminance samples filtered by the filter member 22 are applied to the input of a demultiplexer 499 with the object of being stored in one of the two memories 500 and 501. This storage is effected alternately in these two memories, in such manner that when one memory is in the write mode, the other memory is in the read mode. A multiplexer 505 applies the information components from one of the memories 500 and 501 to the input of the circuit 5. The positions of the demultiplexer 499 and the multiplexer 505 is fixed by complementary signals KM and KMB, respectively, which thus indicate that when the data are present at the data output of the memory 500, the data input of the memory 501 is in connection with the input of the circuit 5, and that when the data output of the memory 500 is in connection with the input of the circuit 5, the data are at the data input of the memory 501.

Addressing, in the write mode, these memories 500 and 501 is effected by means of a counter 509 to which a code conversion circuit 510 is associated, all this to finally effect a selective addressing in the memories 500 and 501 in accordance with the structural criteria of the sampling operation according to the invention. The counter 509 is incremented at the sampling rate fixed by a signal FE supplied by, for example, the camera 1. In addition to the write address code for the memories 500 and 501, the signal W is derived to enable writing of these memories; this signal is applied to the write command WM of the memories 500 and 501 via the two-position multiplexers 530 and 531, which are controlled by the signals KMB and KM, respectively. The signals KM and KMB are obtained from a bistable trigger circuit 540 arranged subsequent to the counter 509; as the capacity of this counter correponds to the high-definition picture elements, the signals KM and KMB change their value at each new picture.

Addressing the memories 500 and 501 in the read mode is effected directly by means of a counter 545 which is incremented at the rate of the signals provided by a frequency divider 550, which divides the signal FE by eight.

To apply the read or write code, two multiplexers 588 and 589 are used which are connected to the memories 500 and 501, respectively.

It is easy for a person skilled in the art to programm the code conversion circuit 510 by referring to the sampling structure of FIG. 6.

As was shown in the foregoing, the sub-sampling circuit 20 applies the samples to the emitter circuit 5 in the following "normal order":

... E11, E15, ... E33, E37, ... in the fields t, t+2T, t+4T, ... and the samples:

... E12, E16, ... E34, E38, ... in the fields t+T, t+3T, t+5T, that is to say the samples are taken line-sequentially.

Figure 12:
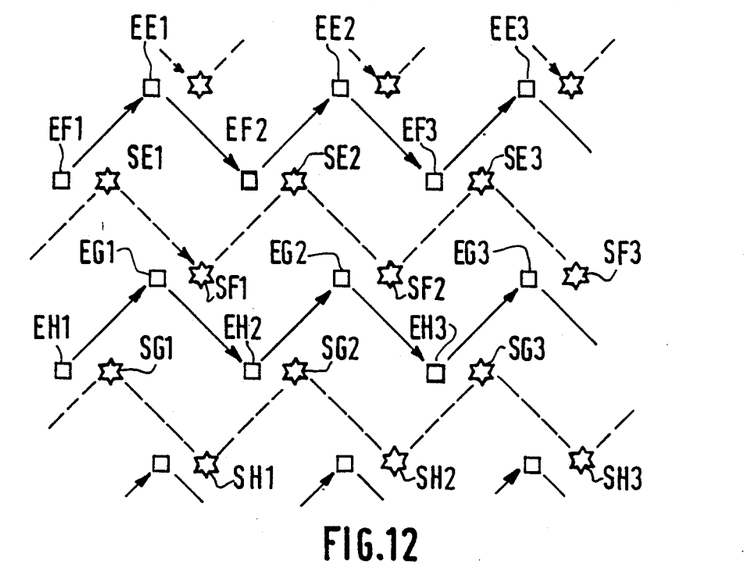
FIG. 12 shows the "compatible order" for the samples.

In accordance with an important feature of the invention which ensures the compatability, the sub-sampling circuit 20 applies the samples to the emitter circuit 5 in the following order (see FIG. 12), the so-called "compatible order":

... E11, E33, E15, ... in the fields t+2T, ... and the samples: ... E12, E34, E16, ... in the fields t+T, t+3T ... that is to say the samples are taken line-alternately.

FIG. 12 shows this compatible order wherein the solid arrows join together the picture elements for a first field and the broken-line arrows join together the picture elements of a second field. It will be clear that thus an array of 312 lines is obtained which interlaces with 312 lines as in normal television and that this order results in a regular scan since the lines remain appropriately equidistantly. It should be noted that the above-mentioned MUSE system could not ensure such a homogeneity of the scan for the compatibility in the case where it should have been provided. It will be evident that to ensure a proper interpolation for the recovery of a high-quality picture, it is necessary to put the samples which appear in the compatible order into the normal order; for this purpose the change-order member 53 is provided.

FIG. 13 shows in detail the structure of the interpolation member 41. Its structure is close to the structure of the member 20, only the parts 95 and 100 have simply been interchanged; the signal ST is replaced by a signal ST' supplied by the receiver circuit 10.

Figure 14:
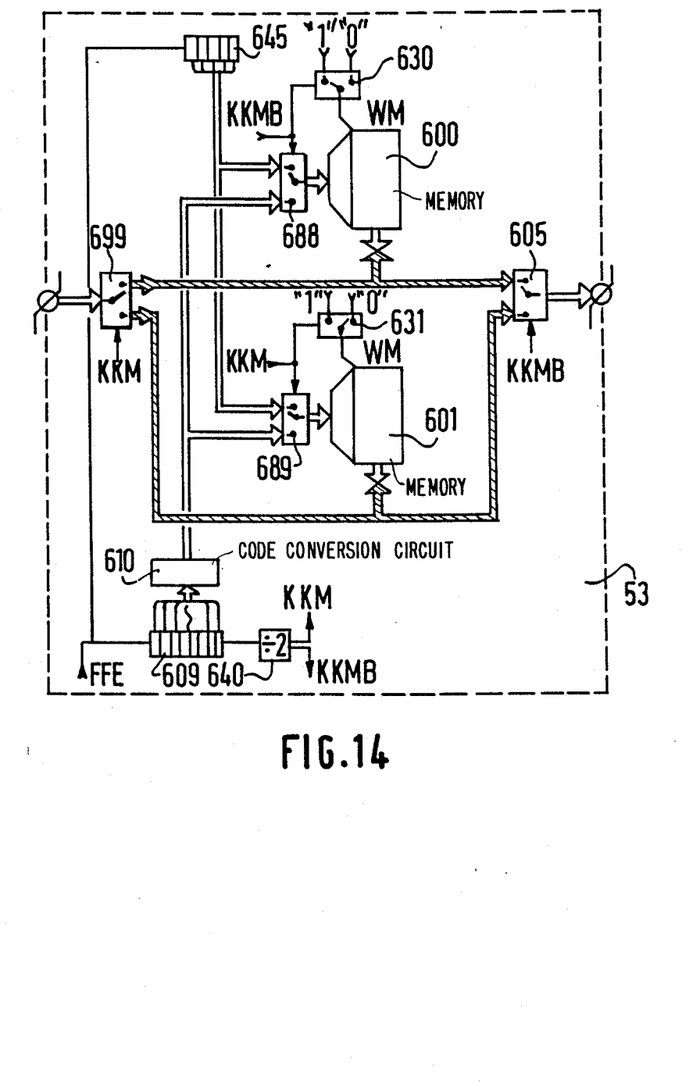
FIG. 14 is a detailed representation of the structure of a change-order member.

FIG. 14 shows in detail the structure of the change-order member. This structure relates to the luminance signal Y'.

The luminance samples Y' appear at the input of a demultiplexer 699 with the object of being stored in one of the two memories 600 and 601. This storage is effected alternately in these two memories, in such manner that when one memory is in the write mode, the other memory is in the read mode. A multiplexer 605 renders it possible to apply the information components from one of the memories 600 and 601 to the input of the television set 40. The positions of the demultiplexer 699 and the multiplexer 605 is fixed by complementary signals KKM and KKMB, respectively, which thus indicate that when the information components Y' are present at the data input of the memory 600, the data input of the memory 602 is in connection with the input of the member 41 and that when the data input of the memory 600 is in connection with the member 41, the information components Y' are present at the data input of the memory 601.

Addressing in the write mode of these memories 600 and 601 is effected by means of a counter 609 with which a code conversion circuit 610 is associated, with the object of effecting a selective addressing in the memories 600 and 601 in accordance with criteria which will be described hereinafter. The counter 609 is incremented at the fixed sampling rate by a signal FFE supplied, for example, by the circuit 10; a write signal "1" is applied to the write control WM of the memories 600 and 601 via the two-position multiplexers 630 and 631, which are controlled by the signals KKMB and KKM, respectively. The signals KKM and KKMB are obtained from a bistable trigger circuit 640 arranged subsequent to the counter 609; since the capacity of this counter corresponds to the number of picture elements of a normal definition, the signals KKM and KKMB change their value at each new picture.

Addressing the memories 600 and 601 in the read mode is effected directly by means of a counter 645 which is incremented at the rate of the signals FFE.

To apply the read or write code, two multipliers 688 and 689 are used which are connected to the memories 500 and 501, respectively.

It is easy for a person skilled in the art to design the code conversion circuit 610 by programming a read-only memory on the basis of the consideration mentioned in the foregoing.

What is claimed is:

1. A system for the transmission of high-definition television pictures via a narrow passband channel, the system comprising a transmission part formed by an arrangement for providing said pictures which are constituted by a plurality of picture samples distributed over even and odd lines, a filter member for filtering said samples, a sampling circuit for taking certain samples of said filter samples from the output of the filter member and a transmission circuit for transmitting said certain samples via the channel, said system further comprising at least one receiving part formed by a receiving circuit for receiving said certain samples, an interpolation member for recovering samples on the basis of said received certain samples and a first display circuit for converting the recovered and certain samples into a restored high-definition picture, characterized in that the sampling circuit comprises means for sampling sequences of at least first and second consecutive and colinear samples on lines of equal parity to obtain said first samples during first field periods, said second samples during second field periods, said first and said second samples forming said certain samples.

2. A system for the transmission of high-definition television pictures via a narrow passband channel as claimed in claim 1, characterized in that the number of samples in each of said sequences is 4.

3. A system for the transmission of high-definition television via a narrow-passband channel as claimed in claim 1, characterized in that the sampling circuit applies said first and said second samples to the transmitter circuit in an order referred to as the "normal order", this order being defined by taking said first and second samples line-sequentially.

4. A system for the transmission of high-definition television pictures via a narrow-passband channel as claimed in claim 1, charcterized in that the sampling circuit applies said first and said second samples to the transmitter circuit in an order referred to as the "compatible order", this order being defined by taking said first and second samples line-alternately, while said at least one receiving art comprises, connected to the output of the receiver circuit, a second display circuit for recovering a picture of a normal definition, and in that each receiving part includes a change-order member disposed between the receiving circuit and the interpolation member for changing the order of said first and second samples from said "compatible order" to a "normal order" in which said first and second samples appear line-sequentially.

5. A system for transmission of high-definition television pictures via a narrow-passband channel as claimed in claim 2, characterized in that the sampling circuit applies said first and said second samples to the transmitter circuit in an order referred to as the "normal order", this order being defined by taking said first and second samples line-sequentially.

6. A system for the transmission of high-definition television pictures via a narrow-passband channel as claimed in claim 2, characterized in that the sampling circuit applies said first and said second samples to the transmitter circuit in an order referred to as the "compatible order", this order being defined by taking said first and second samples line-alternately, while said at least one receiving part comprises, connected to the output of the receiver circuit, a second display circuit for recovering a picture of a normal definition, and in that each receiving part includes a change-order member disposed between the receiving circuit and the interpolation member for changing the order of said first and second samples from said "compatible order" to a "normal order" in which said first and second samples appear line-sequentially.

7. A transmitter suitable for transmission of high-definition television pictures via a narrow passband channel, the transmitter comprising an arrangement for providing said pictures which are constituted by a plurality picture samples distributed over even and odd lines, a filter member for filtering said samples, a sampling circuit for taking certain samples of said filtered samples from the output of the filter member, and a transmission circuit for transmitting said certain samples via the channel, characterized in that the sampling circuit comprises means for sampling sequences of at least first and second consecutive and colinear samples on lines of equal parity to obtain said first samples during first field periods, and said second samples during second field periods, said first and said second samples forming said certain samples.

8. A transmitter as claimed in claim 7, characterized in that the number of samples in each of said sequences is 4.

9. A transmitter as claimed in claim 7, characterized in that the sampling circuit applies said first and said second samples to the transmitter circuit in an order referred to as the "normal order", this order being defined by taking said first and second second samples line-sequentially.

10. A transmitter as claimed in claim 7, characterized in that the sampling circuit applies said first and said second samples to the transmitter circuit in an order referred to as the "compatible order", this order being defined by taking said first and said second samples line-alternately.

11. A transmitter as claimed in claim 8, characterized in that the sampling circuit applies said first and said second samples to the transmitter circuit in an order referred to as the "normal order", this order being defined by taking said first and said second samples line-sequentially.

12. A transmitter as claimed in claim 8, characterized in that the sampling circuit applies said first and said second samples to the transmitter circuit in an order referred to as the "compatible order", this order being defined by taking said first and said second samples line-alternately.

13. A receiver suitable for receiving high-definition television pictures transmitted via a narrow passband channel, said pictures being constituted by a plurality of picture samples distributed over even and odd lines which are filtered and subjected to a sampling process prior to being applied to the channel, said sampling process including sampling sequences of at least first consecutive and colinear samples on lines of equal parity to obtain said first samples during first field periods, and said second samples during second field periods, characterized in that said receiver comprises a receiving circuit for receiving said first and said second samples, an interpolation member for recovering samples on the basis of said received first and second samples, and a first display circuit for converting the recovered samples and said received first and second samples into a restored high-definition picture.

14. A receiver as claimed in claim 13, characterized in that the number of samples in each of said sequences is 4.

15. A receiver as claimed in claim 13, characterized in that said first and said second samples are transmitted in an order referred to as the "normal order", this order being defined by taking said first and said second samples line-sequentially.

16. A receiver as claimed in claim 13, characterized in that said first and said second samples are transmitted in an order referred to as the "compatible order", this order being defined by taking said first and said second samples line-alternately, and in that said receiver further comprises a change-order member disposed between the receiving circuit and the interpolation member for changing the order of said received first and second samples from said "compatible order" to a "normal order" in which said received first and second samples appear line-sequentially.

17. A receiver as claimed in claim 14, characterized in that said first and said second samples are transmitted in an order referred to as the "normal order", this order being defined by taking said first and said second samples line-sequentially.

18. A receiver as claimed in claim 14, characterized in that said first and said second samples are transmitted in an order referred to as the "compatible order", this order being defined by taking said first and said second samples line-alternately, and in that said receiver further comprises a change-order member disposed between the receiving circuit and the interpolation member for changing the order of said received first and second samples from said "compatible order" to a "normal order" in which said received first and second samples appear line-sequentially.

* * * * *